Oct. 30, 1962 A. J. CELENTANO 3,061,678
ALARM SIGNALING SYSTEM
Filed Dec. 8, 1959

INVENTOR
A. J. CELENTANO
BY J. P. Kearns, Jr.
ATTORNEY 3,061,678

ALARM SIGNALING SYSTEM

Arnold J. Celentano, New York, N.Y., assignor to Bell Telephone Laboratories, Incorporated, New York, N.Y., a corporation of New York Filed Dec. 8, 1959, Ser. No. 858,123
5 Claims. (Cl. 179—5)

Figures 1, 2:
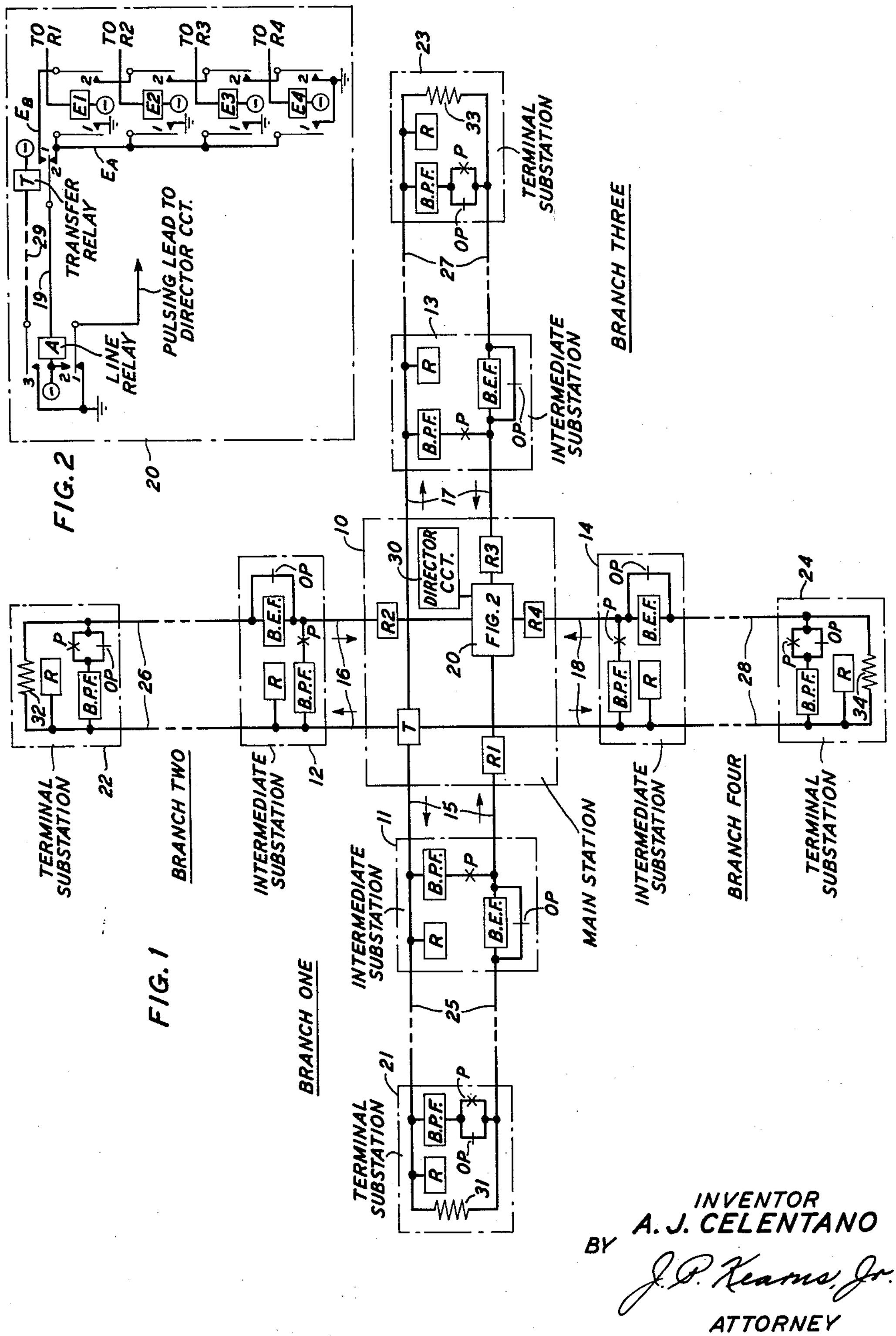

This invention relates to the automatic signalling of alarm conditions to a control center in an electrical communications system and more specifically to improvements in such a system whereby the control center, using shared equipment, may receive alarm reports from a plurality of branches of the communications system which extend in more than one geographical direction.

In the copending patent application of A. E. Bachelet, H. H. Haas and N. A. Newell, Serial No. 763,137, now Patent No. 2,919,307, issued December 29, 1959, filed September 24, 1958, an alarm signaling system is described in detail. In this system an attended control station terminates a closed signaling transmission loop to which a plurality of unattended subsidiary stations are bridged. The main station transmits a voice frequency tone over the outgoing leg of the transmission loop and receives on the incoming leg the same tone. Each subsidiary station is provided with a band-elimination filter tuned to the frequency of the transmitted tone which can be inserted in the incoming leg of the closed signaling loop to block the return of the tone to the main station whenever an alarm condition arises. The receiver at the main station recognizes the absence of tone on the incoming line and causes the control circuits at the main station to remove tone from the outgoing leg as a seizure signal to the subsidiary stations to prepare to receive tone pulses. Each subsidiary station is provided with a receiver circuit bridged to the outgoing leg of the signaling loop which responds to the presence or absence of signaling tone on the loop. Each subsidiary station is likewise provided with a counting circuit to count tone pulses and each subsidiary station has a unique count assigned to it. The tone pulses from the main station are counted by each subsidiary station and when the count of the alarmed subsidiary station is reached, it prepares a reverting path from the outgoing to the incoming leg of the signaling loop for the next tone pulse. The reverted tone pulse is received by the main station which then stops pulsing and registers the number of the alarmed subsidiary station on indicator lights. All other subsidiary stations are locked out from responding to further tone pulsing. The main station next transmits additional series of tone pulses to scan the plurality of alarm devices at the subsidiary station. For each alarm condition the alarmed station reverts a predetermined pulse of a series and the main station registers it on alarm indicator lamps. When all alarms have been registered, the main station returns steady tone to the signaling loop and the system returns to normal.

The same signaling loop is used for calling in particular subsidiary stations and transmitting orders thereto. The loop may also be used for simultaneous voice calling among any or all stations.

This invention is an improvement over the signaling system disclosed in the above-mentioned patent application in that it permits a single main station to monitor alarm devices in a plurality of subsidiary stations located on a plurality of signaling loops radiating therefrom in more than one geographical direction with common transmitting and control equipment.

Accordingly, it is an object of this invention to monitor from a single attended control station a plurality of subsidiary stations having alarm devices and located on a plurality of branch signaling loops.

It is another object of this invention to interconnect a plurality of signaling loops at a main control station so that it appears to the control station that there is but a single signaling loop.

It is yet another object of this invention to allow each branch loop to signal the main control station as though it were the only signaling loop connected to the main station.

According to this invention, two or more separate signaling loops of the type disclosed in the aforesaid patent application are terminated at the same main control station. The outgoing legs of all loops are terminated at the same tone transmitter at the main station so that tone may be applied to all loops simultaneously. Each incoming leg, however, is terminated in a separate tone receiver whose outputs are normally held off ground by the presence of tone on the incoming leg of the associated signaling loop. Each tone receiver is connected to a relay having a pair of make contacts, one set of which is connected in parallel to ground. The remaining contacts of these relays are connected in series to ground. A further auxiliary relay transfers control of the line relay in the main station from the parallel-wired to the series-wired sets of contacts. As will become apparent in the detailed description below, the blocking of tone on any loop will call the director circuits of the main station into automatic operation to remove tone from the outgoing legs of all signaling loops and then to begin pulsing of the tone. Subsequently, after the auxiliary transfer relay has operated, the reverting of tone by a subsidiary station on any signaling loop will operate the main station line relay to actuate the registration circuits.

An important feature of this invention is the marked improvement in flexibility of the tone-on normal alarm signaling system, which increase in flexibility is accomplished with a minimum of additional equipment. The director circuits in the main control station are left unaltered. Likewise, no changes or modifications are required in the subsidiary stations.

The invention will be more fully appreciated after a consideration of the following detailed description and the drawing, in which:

FIG. 1 is a single-line block diagram of an alarm signaling system showing four branch signaling loops controlled according to this invention; and FIG. 2 is an illustrative circuit diagram of the auxiliary relay apparatus used at the main control station in the practice of this invention.

FIG. 1 shows in a single-line diagram an alarm signaling system comprising a main control station 10 and four signaling loops branching in different geographical directions and denominated branches one, two, three and four. Each of the branches considered separately is substantially the same as the single signaling loop described in detail in the aforementioned patent. Considering branch one, for example, it is seen that the signaling loop 15—25 links the main station 10 with a plurality of intermediate substations, such as is shown in block 11, and a terminal substation 21. The loop originates at the main station 10 in the transmitter block T and leads outward from the main station in a westerly direction. Bridged to the outgoing leg at each intermediate substation is a bandpass filter BPF adapted to pass the voice-frequency signaling tone and to reject all other voice frequencies and a receiver R. Receiver R has a normally off-ground output which becomes grounded whenever tone is removed from the outgoing leg of the signaling loop. Also bridged to the outgoing leg of the signaling loop is a terminal substation 21, which also includes a bandpass filter BPF and a receiver R. The filter BPF is normally connected to the incoming or return leg of the signaling loop through a make-contact OP on a relay in the terminal substation. A resistor 31 terminates the loop for other voice frequencies so that the loop may be used for talking purposes as an order wire.

The eastward incoming leg of the signaling loop is returned to the main station 10 and also passes through each intermediate substation. Inserted in the incoming leg at each intermediate substation is a band-elimination filter BEF, which is capable of blocking the return of signaling tone to the main station without interfering with other voice frequencies. The BEF filter is normally shunted by the break contacts OP of a relay in the substation under the control of alarm devices thereat (not shown). Each substation has a plurality of alarm devices as described in the cited patent, the operation of any one of which causes the operation of an OP relay. The operation of this relay removes the shunt around the BEF filter to block the return of tone to the main station as an alerting signal. At the terminal substation the operation of the OP relay by an alarm device opens the path including the BPF filter to prevent the return of tone to the main station. There is also a pulse-reverting P relay at each substation having a make-contact as shown in series with the BPF filter. After the main station has been alerted to an alarm condition at one of the substations, its director circuit 30 acts to remove tone from the outgoing leg as a seizure signal and then to pulse a series of digits to all substations. Each substation and each of its alarms is assigned a number. When an alarmed substation counts its number it reverts the next pulse to the main station by operating the P relay and an appropriate indicator lamp thereat operates.

The incoming leg is terminated at the main station in a receiver R1 which has an off-normal ground in the presence of tone on the incoming leg of the signal loop. Absence of tone grounds the output and starts the scanning operations of the director circuit 30.

In the system described in the aforementioned patent it is possible for the main station to monitor a single signaling loop only. According to the present invention, however, additional signaling loops can be monitored from the same main station and share the transmitter T and the director circuit 30. Accordingly, FIG. 1 shows additional branch loops two, three, and four extending in the north, east and south directions from the main station 10. Branch two includes lines 16—26, intermediate substation 12 and terminal substation 22. Branch three similarly includes lines 17—27, intermediate substation 13 and terminal substation 23. Branch four likewise includes lines 18—28, intermediate substation 14 and terminal substation 24. Each terminal substation includes a talking path terminating resistor such as those designated 32, 33, and 34 in branches two, three, and four, respectively. Each substation includes a receiver R, a BPF filter and a BEF filter as described for substations 11 and 21 on branch one. Any one of these branches, if it were the only one, operates as described in the cited patent.

As shown in FIG. 1, the incoming line for each branch is terminated at the main station by its own receiver, i.e., branch one is terminated by receiver R1, branch two by receiver R2, and so forth. Blocking of tone on any branch operates the associated receiver to ground its output and thereby alert the director circuits at the main control station. The main control station need not know in which branch the alarmed substation is located, inasmuch as all branch loops appear to be in parallel to the main station. Individual stations identify themselves to the main station by the number of the reverted pulse. Numbers may be assigned to individual substations on the several branch loops in any order desired, no numbers being repeated.

The block 20 in FIG. 1 contains the relay circuitry for delivering the initial alerting signal and the later reverted pulses from any branch to the main station director circuit.

FIG. 2 shows an illustrative embodiment of a relay circuit for performing the desired functions of block 20. Each receiver unit has associated with it and controlled by its grounding output an electromagnetic relay, shown as alertting relays E1 through E4. One end of the operating winding of each alerting relay is permanently connected to negative battery as indicated by the encircled minus sign. Two sets of make-contacts are found on each of the alerting relays. Each of the armatures 1 is connectable to ground upon the operation of the relay. All contact 1 armatures connect in turn to the signal lead $E_A$. Each of the sets of contacts 2 is wired in series, the last of the series being grounded as is contact 2 on the E4 relay. The armature 2 on the E1 relay is connected to the signal lead $E_B$.

A transfer relay T has a set of transfer contacts 1 and 2. Contact 1 is connected to lead $E_B$ and is normally open. Contact 2 connects to the lead $E_A$ and is normally closed. The armature of the contact set on relay T connects by way of lead 19 to the line relay A, which forms part of the director circuit 30 of the main control station. The lead 19 connects to one end of the operating coil of the A relay, the other end of which is connected to negative battery as shown. The A relay has a normally open contact 3 connected to ground. The armature of contact 3 of relay A is connected by way of lead 29 to the operating winding of relay T. In the single loop alarm signaling system described in the cited patent the A relay is directly connected to the output of the single receiver found there. Relay A is equipped with a transfer contact 1, 2 by which either ground or battery is applied to a pulsing lead also in the director circuit itself to start the pulsing sequence on receipt of the alerting signal and to stop the pulsing on receipt of a reverted pulse.

The operation of the circuit is such that on the tone being blocked from a branch circuit having an alarm condition, the associated receiver goes on ground and operates the corresponding E relay. This E relay grounds its contact 1 and by way of contact 2 on relay T and lead 19 operates the A relay. Relay A operated places battery on the pulsing lead and alerts the director circuit to remove tone from all loops momentarily and begin outpulsing of the tone. Contact 3 of the A relay closes to ground and operates relay T. Thereupon, contact 1 of relay T closes and contact 2 opens to connect the A relay coil to the $E_B$ lead. In the meantime the removal of tone from the outgoing legs of all loops has caused all receivers R1 through R4 to ground their outputs. Relays E1 through E4 operate and the $E_B$ lead is grounded through contacts 2 on the E relays, thereby holding the A relay operated. Some delay may be inserted in lead 29 (indicated by the broken portion) if it is found undesirable to have the A relay release before all the E relays operate. Now the E relays are in such a condition that a reverted pulse on any branch causes the corresponding receiver to go off-ground and the corresponding E relay to release. The release of any one of the E relays breaks the path to ground through contacts 2 and the A relay releases. Ground is returned to the pulsing lead as a signal either to stop pulsing or to start pulsing the next digit.

It will be apparent to one skilled in the art that the circuit of FIG. 2 may be expanded or contracted to handle more or fewer than four branch loops as shown in FIG. 1 by removing or adding E relays and grounding the last contact 2 of the series-wired contacts. While this invention has been described as a particular illustrative embodiment, it will be apparent that numerous modifications and applications not described herein are possible without departing from the spirit or scope of this invention.

What is claimed is:

1. In an alarm signaling system in which a continuous tone is normally transmitted from a main attended station to a plurality of unattended subsidiary stations over a series transmission loop to which said subsidiary stations are bridged and said subsidiary stations signal an alarm condition to said main station by blocking the return of said continuous tone thereto, said main station responding to said tone blocking by first removing continuous tone from said loop and then pulsing said tone to cause said subsidiary stations to identify themselves by reverting an assigned pulse to the main station, the improvement comprising additional transmission loops branching in different directiones from said main station, additional subsidiary stations bridged to said additional loops, means for applying said tone to all said loops in parallel, single director means for removing continuous tone from said loops and for pulsing said tone, individual tone-responsive means connected to the return line on each transmission loop for supplying an output whenever no tone is being received, means for controlling said director means in parallel from said tone-responsive means when tone is initially blocked on any of said loops due to an alarm condition at one of said subsidiary stations, and means for transferring control of said director means to said tone-responsive means in series upon the removal of tone from all loops by said main station whereby a reverted tone pulse identifying any one of said subsidiary stations causes said director means to stop the pulsing of tone.

2. The alarm signaling system according to claim 1 in which said controlling means comprises an alerting relay connected to the output of each tone-responsive means, a first set of make-contacts on said alerting relays individually closable to a ground reference point, a first signal lead interconnecting said first set of contacts in parallel, a second set of make-contacts closable to a ground reference point when all of said alerting relays are operated, a second signal lead connected to the one of said second set of contacts remotest from the ground reference point, and a transfer relay normally connecting said first signal lead to said director means but operable upon the operation of all said alerting relays to connect said second signal lead to said director means whereby the release of any one of said alerting relays when a tone pulse is reverted on any of said transmission loops permits said director means to release.

3. In combination, an alarm signaling system having a control station and a plurality of substations, a plurality of branch signaling loops linking said control station to groups of said substations, said control station normally applying a steady tone to said loops in parallel, said substations having alarm devices which upon operation cause the blocking of said tone on the return leg of the associated branch loop, signaling means at said control station for first removing said tone from all loops as a seizure signal and then pulsing said tone to call in each substation one by one to identify itself and the status of its alarms by reverting preassigned pulses to said control station, a repeating relay for each of said branch loops at said main station, means for operating said signaling means when tone is blocked from any of said loops comprising a first set of contacts connectable to an individual ground reference on said repeating relays and a transfer relay normally connecting said first set of contacts to said signaling means and operated after said signaling means, and means for releasing said signaling means when a tone pulse is reverted by an alarmed substation on any of said loops comprising a second set of contacts on said repeating relays connected in series to ground reference when all said repeating relays are operated and a transfer contact on said transfer relay for connecting said second set of contacts to said signaling means in place of said first set of contacts.

4. In combination, an alarm signaling system having a plurality of branch signaling loops radiating in different geographical directions from a control station, a plurality of unattended substations connected at spaced points along said branch loops, means at said control station for applying a signaling tone to the outgoing portion of said loops in parallel, alarm devices at each of said substations, means at each of said substations for blocking the return of signaling tone to said control station on one of said loops whenever one of said alarm devices operates, means at said control station terminating the incoming portion of each of said loops for detecting the blocking of said tone, director means at said control station for removing said tone from the outgoing portions of all loops as a seizure signal and for pulsing said tone until the alarmed substation identifies itself by reverting preassigned ones of said pulses, and means for calling said director means into operation upon the blocking of tone from any of said signaling channels and for releasing said director means from operation upon the reverting of a pulse of signaling frequency by an alarmed substation on any loop comprising a signal relay for each channel operated upon the removal of incoming signaling frequency from the associated channel and released upon the reverting of a signaling pulse from an alarmed substation, a first set of normally open contacts on each of said signal relays connectable individually to a common ground reference point, a second set of normally open contacts on each of said signal relays connectable to a ground reference point only when all of said signal relays operate, and a transfer relay operated whenever any of said signal relays operates, said transfer relay normally connecting said first set of contacts to said director means and upon operation connecting said second set of contacts to said director means.

5. In combination, a plurality of signaling loops, means for supplying a signal frequency to one end of all said loops in parallel, detector means responsive to the presence or absence of said signal frequency at the other end of each of said loops, means for producing an alerting output whenever any of said detector means recognizes the removal of said signal frequency on any of said signaling loops, and means for terminating said alerting output whenever any of said detector means recognizes the restoral of said signal frequency on any of said signaling loops.

References Cited in the file of this patent

UNITED STATES PATENTS

| | | |
|---|---|---|
| 2,919,307 | Bachelet et al. | Dec. 29, 1959 |
| 2,923,772 | Wadsworth | Feb. 2, 1960 |